United States Patent
Sashida et al.

(10) Patent No.: US 9,032,257 B2
(45) Date of Patent: May 12, 2015

(54) TRANSMISSION APPARATUS AND TRANSMISSION APPARATUS CONTROL METHOD

(71) Applicant: Fujitsu Limited, Kawasaki-shi (JP)

(72) Inventors: Nobuo Sashida, Sagmihara (JP); Kazushige Saito, Yokohama (JP); Kazuhiko Hata, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/676,470

(22) Filed: Nov. 14, 2012

(65) Prior Publication Data
US 2014/0136879 A1    May 15, 2014

(51) Int. Cl.
*G06F 11/00* (2006.01)
*G06F 11/20* (2006.01)
*G06F 1/30* (2006.01)

(52) U.S. Cl.
CPC .......... *G06F 11/2005* (2013.01); *G06F 11/008* (2013.01); *G06F 1/30* (2013.01)

(58) Field of Classification Search
USPC .......................................... 714/4.11, 4.1, 4.2
See application file for complete search history.

(56) References Cited

U.S. PATENT DOCUMENTS

| | | | |
|---|---|---|---|
| 5,469,427 A | 11/1995 | Sato | |
| 5,557,636 A | 9/1996 | Sato | |
| 6,141,532 A * | 10/2000 | Mizuike et al. | 455/8 |
| 8,595,550 B1 * | 11/2013 | Heath et al. | 714/14 |
| 2010/0115338 A1 * | 5/2010 | Rao et al. | 714/37 |
| 2012/0204066 A1 * | 8/2012 | Noble et al. | 714/43 |

FOREIGN PATENT DOCUMENTS

| | | |
|---|---|---|
| JP | 61-108230 | 5/1986 |
| JP | 64-73935 | 3/1989 |
| JP | 4-147014 | 5/1992 |
| JP | 6-29881 | 2/1994 |
| JP | 7-95132 | 4/1995 |
| JP | 7-264171 | 10/1995 |
| JP | 8-236968 | 9/1996 |
| JP | 11-168410 | 6/1999 |

(Continued)

OTHER PUBLICATIONS

Japanese Office Action mailed Jan. 21, 2014 in corresponding Japanese Patent Application No. 2012-517076.

(Continued)

*Primary Examiner* — Sarai Butler
(74) *Attorney, Agent, or Firm* — Staas & Halsey LLP

(57) ABSTRACT

A first interface board includes a first signal processing unit that performs a predetermined process on a signal. A second interface board includes a second signal processing unit that performs the predetermined process on a signal. When no failure occurs in both interface boards, a switching control unit selects the first interface board. When a failure occurs in the first interface board, the switching control unit selects the second interface board. When there is no failure in both the interface boards and the first interface board does not satisfy a predetermined degradation condition, the electrical power supply control unit supplies electrical power to the first interface board and prohibits the supply of electrical power to the second interface board. When there is no failure in both the interface boards but the predetermined degradation condition is satisfied, the electrical power supply control unit supplies electrical power to both the interface boards.

7 Claims, 15 Drawing Sheets

(56) References Cited

FOREIGN PATENT DOCUMENTS

| | | |
|---|---|---|
| JP | 11-341547 | 12/1999 |
| JP | 2005-27173 | 1/2005 |
| JP | 2005-38954 | 2/2005 |
| JP | 2009-38688 | 2/2009 |

OTHER PUBLICATIONS

International Search Report of Corresponding PCT Application PCT/JP2010/059141 mailed Jul. 20, 2010.

* cited by examiner

FIG.3

| UNIT TYPE | GUARANTEE PERIOD | INSTALLATION COUNT (SUM TOTAL) | POWER-ON TIME PERIOD (SUM TOTAL) | FAILURE PREDICTION DATE |
|---|---|---|---|---|
| MPU BOARD (W) | 10 YEARS | 1 TIME | 1 DAY | 2018/2/23 |
| MPU BOARD (P) | 10 YEARS | 10 TIMES | 2 DAYS | 2018/2/24 |
| SWITCH (W) | 10 YEARS | 11 TIMES | 2 DAYS | 2018/2/25 |
| SWITCH (P) | 10 YEARS | 12 TIMES | 2 DAYS | 2018/2/26 |
| IF #01 | 10 YEARS | 1 TIME | 2 DAYS | 2018/2/27 |
| IF #02 | 10 YEARS | 14 TIMES | 2 DAYS | 2018/2/28 |
| ... | | | | |
| IF #16 | 10 YEARS | 16 TIMES | 2 DAYS | 2018/3/2 |
| 301 | 302 | 303 | 304 | 305 |

| POWER-ON TIME PERIOD | FIRST FAILURE PREDICTION COEFFICIENT |
|---|---|
| 1 TO 365 DAYS | 90% (WITH RESPECT TO GUARANTEE PERIOD FOR I/F BOARD) |
| 366 TO 730 DAYS | 80% |
| 731 TO 1,095 DAYS | 70% |
| 1,096 TO 1,460 DAYS | 60% |
| 1,461 TO 1,825 DAYS | 50% |
| 1,826 TO 2,190 DAYS | 40% |
| 2,191 TO 2,555 DAYS | 30% |
| 2,556 TO 2,920 DAYS | 20% |
| 2,921 TO 3,285 DAYS | 10% |
| 3,286 DAYS OR MORE | NULL |

402

| INSTALLATION COUNT | SECOND FAILURE PREDICTION COEFFICIENT |
|---|---|
| 1 TO 100 TIMES | 90% (WITH RESPECT TO TENTATIVE FAILURE PREDICTION DATE) |
| 101 TO 200 TIMES | 80% |
| 201 TO 300 TIMES | 70% |
| 301 TO 400 TIMES | 60% |
| 401 TO 500 TIMES | 50% |
| 501 TO 600 TIMES | 40% |
| 601 TO 700 TIMES | 30% |
| 701 TO 800 TIMES | 20% |
| 801 TO 900 TIMES | 10% |
| 901 TIMES OR MORE | NULL |

FIG.5

| | GUARANTEE PERIOD | INSTALLATION DATE | POWER-ON TIME PERIOD | | INSTALLATION COUNT | |
|---|---|---|---|---|---|---|
| | | | CURRENT VALUE | FIRST FAILURE PREDICTION COEFFICIENT | CURRENT VALUE | SECOND FAILURE PREDICTION COEFFICIENT |
| MPU BOARD (W) | 10 YEARS | 2010/1/20 | 1 DAY | 90% | 1 TIME | 90% |
| MPU BOARD (P) | 10 YEARS | 2010/1/21 | 1 DAY | 90% | 1 TIME | 90% |
| SWITCH (W) | 10 YEARS | 2010/1/22 | 1 DAY | 90% | 1 TIME | 90% |
| SWITCH (P) | 10 YEARS | 2010/1/23 | 1 DAY | 90% | 1 TIME | 90% |
| IF #01 | 10 YEARS | 2010/1/24 | 1 DAY | 90% | 1 TIME | 90% |
| IF #02 | 10 YEARS | 2010/1/25 | 1 DAY | 90% | 1 TIME | 90% |
| ... | | | | | | |
| IF #16 | 10 YEARS | 2010/1/27 | 1 DAY | 90% | 1 TIME | 90% |
| | 502 | 503 | 504 | 505 | 506 | 507 |

TRANSMISSION APPARATUS AND TRANSMISSION APPARATUS CONTROL METHOD

CROSS-REFERENCE TO RELATED APPLICATION

This application is a continuation of International Application No. PCT/JP2010/059141, filed on May 28, 2010 and designating the U.S., the entire contents of which are incorporated herein by reference.

FIELD

The embodiments discussed herein are related to a transmission apparatus and a transmission apparatus control method.

BACKGROUND

Conventionally, in a transmission apparatus, a service operation is performed in a state in which both an active interface (IF) board (ACT system) and a standby IF board (SBY system) are mounted on the transmission apparatus in anticipation of a failure, such as line abnormality or a hardware failure. With such a transmission apparatus, a process is performed by the active IF board after the start until a failure occurs in the active IF board. Furthermore, the standby IF board is kept in a standby state until a failure occurs. If a failure occurs in the active IF board, the process is switched to the standby IF board and the process that was being performed by the active IF board is taken over by the standby IF board. A processes performed by the active IF board and the standby IF board can be, for example, a conversion process that converts an electrical signal to/from an optical signal or a process for performing predetermined processing, such as amplification, on a signal that has been transmitted/received.

However, electrical power is supplied to the standby IF board even though it is in a standby state and thus the standby IF board consumes electrical power. The reason for this is to avoid an instantaneous power interruption when the process is switched from the active IF board to the standby IF board and to provide a seamless service for a user.

In contrast, in recent years, the reliability of IF boards has increased due to improvements in the durability of components used in the transmission apparatus. Accordingly, even if the operation of the standby IF board is stopped and no electrical power supplied to it until there is a high possibility that a failure occurs due to, for example, degradation of the active IF board, an instantaneous power interruption is less likely to occur.

The use of a conventional technology has been proposed to reduce electrical power consumption by stopping a process performed by a standby optical interface board. Furthermore, the use of a conventional technology has also been proposed to reduce electrical power consumption by setting the power supply of a standby transmitting unit that is not performing communication to an off state.

Patent Document 1: Japanese Laid-open Patent Publication No. 7-95132
Patent Document 2: Japanese Laid-open Patent Publication No. 2005-27173

There is a problem however in that even if the reliability of the IF board is improved, the active IF board may possibly become degraded due to insertion and extraction of the IF board to/from the transmission apparatus or due to conditions changing over time. In a state in which a failure rate increases due to the degradation of the active IF board, there is a high possibility that a process will be switched to the standby IF board. Accordingly, if the active IF board is degraded, it is preferable to make a state in which switching to the standby system can be immediately performed in order to cope with an instantaneous power interruption.

With the conventional technology for stopping a process performed by a standby IF board, because electrical power is supplied to the standby IF board, the electrical power consumption is not sufficiently reduced. Furthermore, with the conventional technology for reducing the electrical power consumption by turning off the power supply, even if the probability of switching boards increases due to the degradation of the active IF board, because power is not supplied to the standby IF board, an instantaneous power interruption may possibly occur at the time of switching boards.

SUMMARY

According to an aspect of an embodiment, a transmission apparatus includes: a receiving unit that receives a signal from an external source; an electrical power supplying unit that supplies electrical power; a first interface board that includes a first signal processing unit that performs a predetermined process on the signal received by the receiving unit; a second interface board that includes a second signal processing unit that performs the predetermined process on the signal received by the receiving unit; a switching control unit that selects the first interface board when no failure occurs in both the first interface board and the second interface board and that performs switching such that the switching control unit selects the second interface board; an electrical power supply control unit that, in a case in which no failure occurs in both the first interface board and the second interface board and when the first interface board does not satisfy a predetermined degradation condition, supplies electrical power from the electrical power supplying unit to the first interface board and prohibits supply to the second interface board and that, in a case in which no failure occurs in both the first interface board and the second interface board and when the first interface board does satisfy the predetermined degradation condition, supplies electrical power from the electrical power supplying unit to both the first interface board and the second interface board; and a transmitting unit that transmits a signal processed by one of the first interface board and the second interface board that is selected by the switching control unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of data stored by each unit;

FIG. 4 is a schematic diagram illustrating an example of failure prediction coefficient tables;

FIG. 5 is a schematic diagram illustrating failure prediction date equation information acquired by each unit;

DESCRIPTION OF EMBODIMENTS

Preferred embodiments of the present invention will be explained with reference to accompanying drawings.

The transmission apparatus and the transmission apparatus control method disclosed in the present invention is not limited to the embodiments.

[a] First Embodiment

Figure 1:
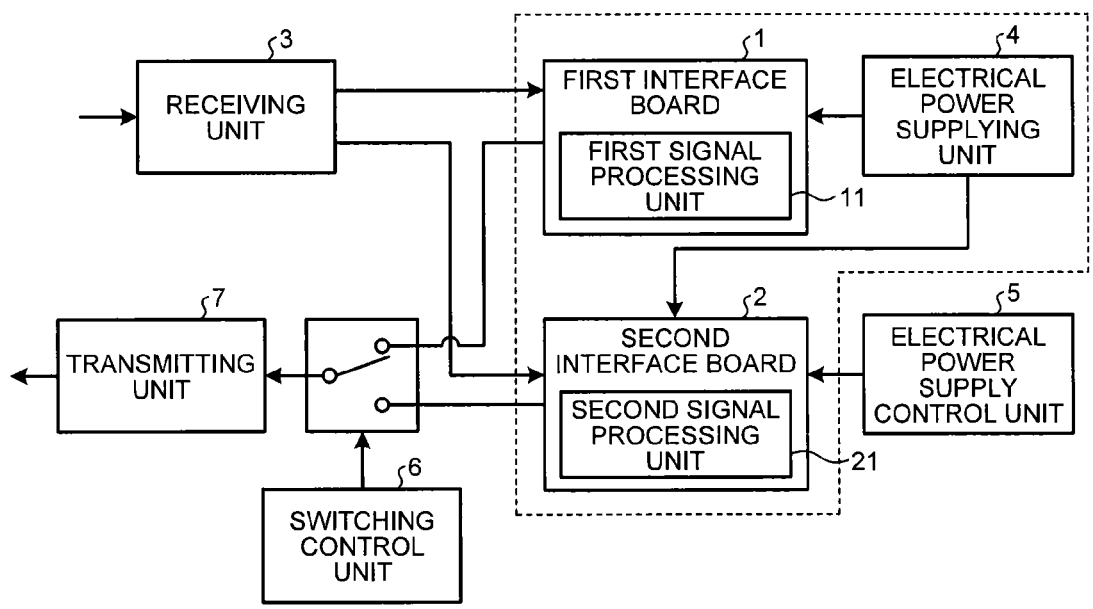
FIG. 1 is a block diagram illustrating a transmission apparatus according to a first embodiment.

FIG. 1 is a block diagram illustrating a transmission apparatus according to a first embodiment. As illustrated in FIG. 1, the transmission apparatus according to the first embodiment includes a first interface board 1, a second interface board 2, a receiving unit 3, an electrical power supplying unit 4, an electrical power supply control unit 5, a switching control unit 6, and a transmitting unit 7.

The receiving unit 3 receives a signal from an external source. Then, the receiving unit 3 outputs the signal received from the external source to a first signal processing unit 11 in the first interface board 1 and to a second signal processing unit 21 in the second interface board 2.

The first interface board 1 includes the first signal processing unit 11. The first interface board 1 is driven by an electrical power supply received from the electrical power supplying unit 4. The first interface board 1 receives an input of a signal from the receiving unit 3. Then, the first signal processing unit 11 performs a process on the signal received from the receiving unit 3. The first interface board 1 outputs the processed signal to the transmitting unit 7. In the first embodiment, the first interface board 1 is used as an active interface board. The active interface board mentioned here is assumed to be an interface board in which, until a failure occurs in the interface board, a signal processed by the interface board is used as a transmission signal.

The second interface board 2 includes the second signal processing unit 21. The second interface board 2 is driven by an electrical power supply received from the electrical power supplying unit 4. The second interface board 2 receives an input of a signal from the receiving unit 3. Then, the second interface board 2 performs a process on the signal received from the receiving unit 3. Then, the second interface board 2 outputs the processed signal to the transmitting unit 7. In the first embodiment, the second interface board 2 is used as a standby interface board. The standby interface board mentioned here is an interface board that is paired with an active interface board and has redundant configuration. It is assumed that the standby interface board is an interface board in which the signal processed by itself is used as a transmission signal, if a failure occurs in an active interface board that is paired with the standby interface board. The second interface board 2 is paired with the first interface board 1 to create a redundant configuration.

The switching control unit 6 switches such that either one of the signal output from the first interface board 1 and the second interface board 2 is input to the transmitting unit 7. In FIG. 1, the selection of the interface board that uses a signal is a switching that is physically performed; however, another method may also be used. For example, the switching control unit 6 may also discard one of a signal that is not used out of both the received signals and then output the remaining signal to the transmitting unit 7. In the first embodiment, because the first interface board 1 is an active interface board, before a failure occurs in the first interface board 1, the switching control unit 6 performs the switching such that a signal output from the first interface board 1 is input to the transmitting unit 7. If a failure occurs in the first interface board 1, the switching control unit 6 performs the switching such that the signal output from the second interface board 2 is input to the transmitting unit 7.

The electrical power supply control unit 5 determines whether the first interface board 1 satisfies a predetermined degradation condition. If the first interface board 1 does not satisfy the predetermined degradation condition, the electrical power supply control unit 5 allows the electrical power supplying unit 4 to supply electrical power to the first interface board 1 and to prohibit the supply of electrical power to the second interface board 2. In contrast, if the first interface board 1 satisfies the predetermined degradation condition, the electrical power supply control unit 5 allows the electrical power supplying unit 4 to supply electrical power to both the first interface board 1 and the second interface board 2.

The transmitting unit 7 receives an input of the processed signal output from one of the first interface board 1 and the second interface board 2 selected by the switching control unit 6. Then, the transmitting unit 7 outputs the signal that is input from one of the first interface board 1 and the second interface board 2 to the an external source.

As described above, with the transmission apparatus according to the first embodiment, if an active interface board does not satisfy a predetermined degradation condition, the active interface board does not supply electrical power to a standby interface board. If the active interface board does satisfy the predetermined degradation condition, the active interface board starts supplying electrical power to the standby interface board. Accordingly, if the possibility of the occurrence of a failure in the active interface board is low, it is possible not to supply electrical power to the standby interface board and thus electrical power consumption can be reduced. Accordingly, it is possible to reduce the electrical power consumption of the transmission apparatus and the occurrence of an instantaneous power interruption when a failure occurs.

[b] Second Embodiment

Figure 2:
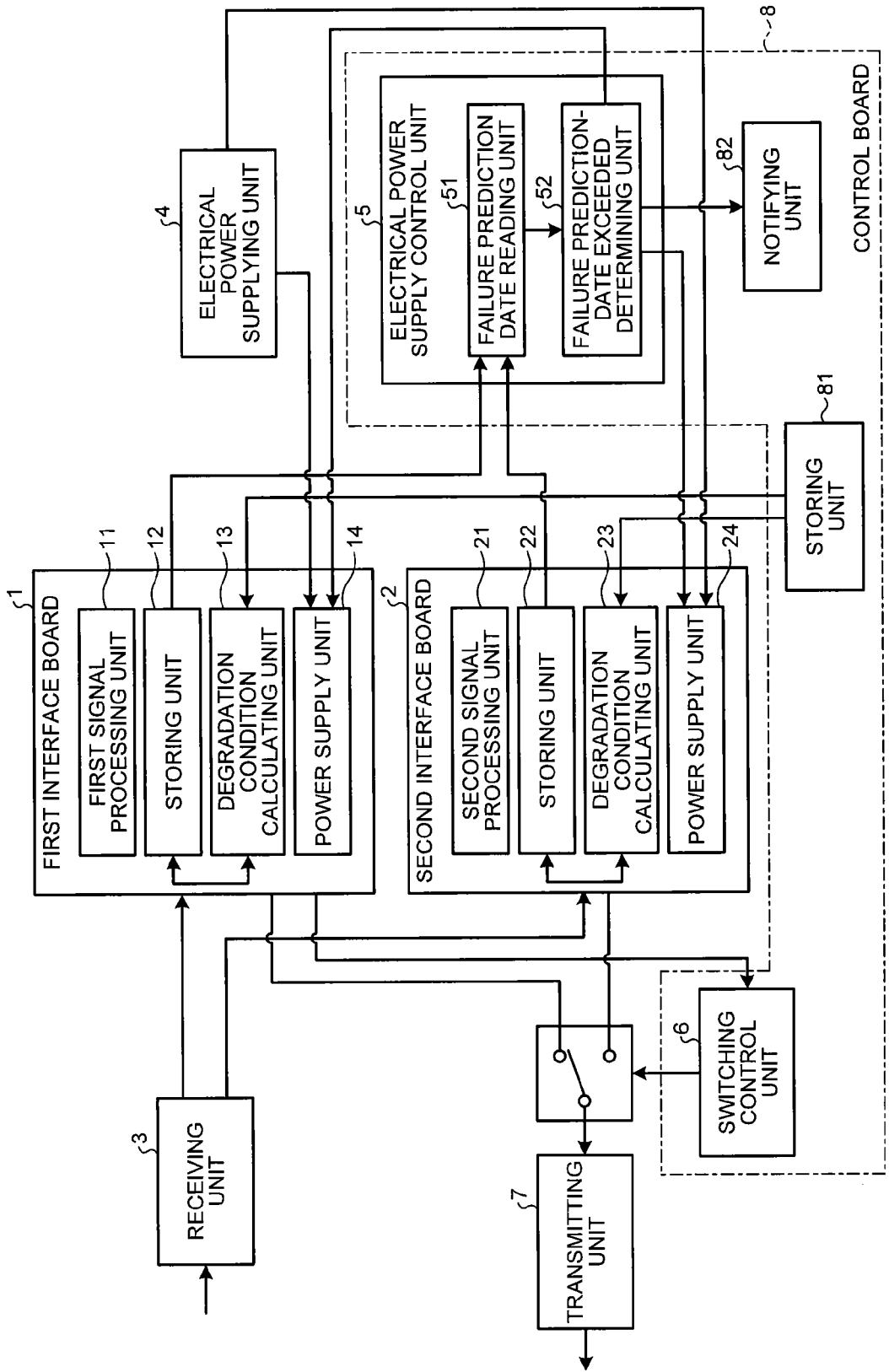
FIG. 2 is a block diagram illustrating a transmission apparatus according to a second embodiment.

FIG. 2 is a block diagram illustrating a transmission apparatus according to a second embodiment. As illustrated in FIG. 2, the transmission apparatus according to the second embodiment includes the first interface board 1, the second interface board 2, the receiving unit 3, the electrical power supplying unit 4, the electrical power supply control unit 5, the switching control unit 6, and the transmitting unit 7. In the second embodiment, the first interface board 1 is assumed to be an active interface board and the second interface board 2 is assumed to be a standby interface board that is paired with the first interface board 1. FIG. 2 only illustrates a single redundant configuration in which the first interface board 1 is paired with the second interface board 2; however, multiple redundant configurations may also be used. It is assumed that the transmission apparatus according to the second embodiment also has multiple redundant configurations. In the following, the interface board may sometimes be referred to as an "IF board".

The receiving unit 3 receives a signal from an external source. Then, the receiving unit 3 outputs the signal received from the external source to the first interface board 1 and the second interface board 2.

The first interface board 1 includes the first signal processing unit 11, a storing unit 12, a degradation condition calculating unit 13, and a power supply unit 14. The first interface board 1 can be inserted in and extracted from the transmission apparatus. Furthermore, the first interface board 1 includes an installation-count counter (not illustrated) and a power-on time period counter. Furthermore, the first interface board 1 also includes a clock (not illustrated).

The first interface board 1 increments the installation-count counter every time the first interface board 1 is inserted in the transmission apparatus. Specifically, the installation-count counter counts the number of times the first interface board 1 has been inserted in the transmission apparatus. In the following, the number of times the first interface board 1 is inserted in the transmission apparatus may sometimes be referred to as the "installation count" of the first interface board 1.

Furthermore, the first interface board 1 increments the power-on time period counter every day when a predetermined time has elapsed in which the first interface board 1 is in a state in which it is inserted in the transmission apparatus. Specifically, the power-on time period counter counts the number of days that the first interface board 1 is inserted in the transmission apparatus. In the following, the number of days that the first interface board 1 is inserted in the transmission apparatus may sometimes be referred to as the "power-on time period" of the first interface board 1. In the second embodiment, the number of days is used as the power-on time period; however, the total sum of time during which the first interface board 1 is inserted in the transmission apparatus may also be used as the power-on time period.

The storing unit 12 is a storage device, such as a hard disk or a memory. The storing unit 12 in the first interface board 1 stores therein the information illustrated in FIG. 3. FIG. 3 is a schematic diagram illustrating an example of data stored by each unit. The units mentioned here include, for example, each of the interface boards, a micro processing unit (MPU) board, and a switch (SW) board. The storing unit 12 stores therein the installation count of the first interface board 1 counted by the installation-count counter and the power-on time period of the first interface board 1 counted by the power-on time period counter. Furthermore, the storing unit 12 also stores therein a failure prediction date calculated by the degradation condition calculating unit 13, which will be described later. Furthermore, in the second embodiment, the storing unit 12 stores therein the guarantee period of the first interface board 1. For example, in a unit type 301 in FIG. 3, an IF #01 represents the first interface board 1. The storing unit 12 in the first interface board 1 stores therein 10 years as a guarantee period 302, one time as an installation count 303, 2 days as a power-on time period 304, and Feb. 27, 2018 as a failure prediction date 305.

The first signal processing unit 11 performs a process on the signal received from the receiving unit 3. The processes performed on the signal can be, for example, inter-conversion between an optical signal and an electrical signal, error detection, rate conversion, and distribution of a signal.

The degradation condition calculating unit 13 includes a storage medium, such as a memory and a hard disk. The degradation condition calculating unit 13 stores therein failure prediction coefficient tables used to obtain a failure prediction date from the failure prediction date equation. Specifically, the degradation condition calculating unit 13 stores therein a table 401 and a table 402 illustrated in FIG. 4. FIG. 4 is a schematic diagram illustrating an example of failure prediction coefficient tables. The failure prediction date is an example of a degradation condition.

In the following, a failure prediction coefficient will be described. The table 401 illustrated in FIG. 4 is a table for a first failure prediction coefficient with respect to the power-on time period used to calculate the tentative failure prediction date using the power-on time period. As illustrated in the table 401, the first failure prediction coefficient is determined for each power-on time period range. For example, a power-on time period 411 represents a power-on time period in a range between equal to or greater than 1 day and equal to or less than 365 days and a first failure prediction coefficient 412 is a first failure prediction coefficient associated with the power-on time period 411. Specifically, for the power-on time period 411, the first failure prediction coefficient 412 is 90% for an interface board in which the power-on time period is equal to or greater than 1 day and equal to less than 365 days. Furthermore, in the failure prediction calculation equation, the first failure prediction coefficient is a value with respect to the guarantee period for each interface board. Each of the interface boards has a predetermined guarantee period. However, the interface board is degrades daily in accordance with the power-on time period. Accordingly, in the table 401, by making the coefficient small as the power-on time period becomes long, the time period for which the incidence of failure becomes high is calculated such that the time period is shortened in accordance with the degradation.

Furthermore, the table 402 illustrated in FIG. 4 is a table for a second failure prediction coefficient with respect to the installation count used to calculate, by using the installation count, a failure prediction date from a tentative failure prediction date. As illustrated in the table 402, the second failure prediction coefficient is determined for each range of the installation count. For example, an installation count 421 represents the number of installations in a range between equal to or greater than once and equal to or less than 100 times, and a second failure prediction coefficient 422 is a second failure prediction coefficient associated with the installation count 421. Specifically, for the installation count 421, the second failure prediction coefficient 422 is 90% for an interface board in which the installation count is equal to or greater than once and equal to or less than 100 times. Furthermore, in the failure prediction calculation equation, the second failure prediction coefficient is a value with respect to a tentative failure prediction date. An interface board gradually degrades in accordance with the installation count. Accordingly, in the table 402, by making the coefficient small as the installation count increases, the time period for which the incidence of failure becomes high is calculated such that the time period is shortened in accordance with the degradation.

Furthermore, the degradation condition calculating unit 13 previously stores therein the failure prediction date equation. In the second embodiment, the degradation condition calculating unit 13 stores therein the following equations as the failure prediction date equations.

time period until a tentative failure prediction date=guarantee period of an IF board×the first failure prediction coefficient  (1)

failure prediction date=installation date of an IF board+time period until a tentative failure prediction date×second failure prediction coefficient  (2)

At this point, Equations (1) and (2) in the second embodiment are statistically obtained such that the failure prediction date is calculated in which the incidence of failure is higher than a predetermined value. For example, the occurrence pattern of a device problem is represented by a curve called a bathtub curve. This curve is a curve indicating that an initial failure occurs, a stable period continues after the initial failure, and then the incidence of a problem often occurs due to age deterioration of components. Then, the failure prediction date equation is obtained by using a method that specifies, from the incidence pattern of the device problem represented by this curve, a point in which the incidence of a problem is higher than a predetermined value and creates a failure prediction date equation such that the failure prediction date matches that point.

In the following, the operation of calculating a failure prediction date performed by the degradation condition calculating unit 13 will be described. The degradation condition calculating unit 13 first obtains, from each unit, failure prediction date equation information needed to predict the failure prediction date. FIG. 5 is a schematic diagram illustrating the failure prediction date equation information acquired by each unit. In the second embodiment, as illustrated in FIG. 5, a guarantee period, the date on which an IF board is inserted into the transmission apparatus (hereinafter, sometimes referred to as an "installation date"), a current value of a power-on time period, the first failure prediction coefficient, a current value of installation count, and the second failure prediction coefficient are used. In the second embodiment, the degradation condition calculating unit 13 obtains a guarantee period 502 of the first interface board 1 from the storing unit 12. In the second embodiment, as illustrated in FIG. 3, because the guarantee period 302 of the first interface board 1 is 10 years, the degradation condition calculating unit 13 obtains 10 years as the guarantee period 502. Then, the degradation condition calculating unit 13 obtains an installation date 503 from a storing unit 81 on a control board 8, which will be described later, in the first interface board 1. In the second embodiment, it is assumed that the first interface board 1 was inserted in the transmission apparatus on Jan. 24, 2010. Accordingly, the degradation condition calculating unit 13 obtains, as the installation date 503, Jan. 24, 2010. Furthermore, the degradation condition calculating unit 13 obtains, from the storing unit 12, a power-on time period and uses it as a current value 504 of the power-on time period. In the second embodiment, as illustrated in FIG. 3, because the power-on time period of the first interface board 1 is 2 days, the degradation condition calculating unit 13 obtains 2 days as the current value 504 of the power-on time period. Then, the degradation condition calculating unit 13 obtains a first failure prediction coefficient 505 of the first interface board 1 from the table 401 stored by the degradation condition calculating unit 13. In the second embodiment, because the power-on time period of the first interface board 1 is 2 days, the degradation condition calculating unit 13 obtains 90% as the first failure prediction coefficient 505. Furthermore, the degradation condition calculating unit 13 obtains an installation count from the storing unit 12 and uses the value as a current value 506 of the installation count. In the second embodiment, as illustrated in FIG. 3, because the installation count of the first interface board 1 is one, the degradation condition calculating unit 13 obtains one time as the current value 506 of the installation count. Then, the degradation condition calculating unit 13 obtains a second failure prediction coefficient 507 of the first interface board 1 from the table 402 stored by the degradation condition calculating unit 13. In the second embodiment, because the installation count of the first interface board 1 is one, the degradation condition calculating unit 13 obtains 90% as the second failure prediction coefficient 507.

The degradation condition calculating unit 13 calculates the failure prediction date of the first interface board 1 by using the guarantee period 502, the installation date 503, the current value 504 of the power-on time period, the first failure prediction coefficient 505, the current value 506 of the installation count, and the second failure prediction coefficient 507 for Equations (1) and (2).

At this point, in the second embodiment, because the installation date 503 of the first interface board 1 is Jan. 24, 2010 and the guarantee period 502 is 10 years, the degradation condition calculating unit 13 calculates the maximum guarantee date of an IF board to be Jan. 24, 2020, i.e., Jan. 24, 2010+3650 days=Jan. 24, 2020.

Furthermore, in the second embodiment, because the guarantee period 502 of the first interface board 1 is 10 years and the first failure prediction coefficient 505 is 90%, the degradation condition calculating unit 13 calculates, by using Equation (1), the time period until tentative failure prediction date to be 10 years×90%=3,285 days, i.e., the time period until the tentative failure prediction date is given as Jan. 24, 2010+3,285 days=Jan. 22, 2019. Furthermore, because the second failure prediction coefficient is 90%, the degradation condition calculating unit 13 calculates, by using Equation (2), the failure prediction date to be Feb. 27, 2018, i.e., Jan. 24, 2010+3,285×90%=Feb. 27, 2018.

Then, the degradation condition calculating unit 13 allows the storing unit 12 to store the calculated failure prediction date of the first interface board 1.

In response to the instruction received from the electrical power supply control unit 5, the power supply unit 14 performs an ON/OFF operation on its power supply. If the power supply is ON, the power supply unit 14 supplies electrical power, which is supplied from the electrical power supplying unit 4, to each unit in the first interface board 1. If the power supply is OFF, the power supply unit 14 does not receive electrical power supplied from the electrical power supplying unit 4. The ON/OFF operation of the power supply performed by the power supply unit 14 will be described later together with a description of a power supply unit 24 in the second interface board 2.

The second interface board 2 includes the second signal processing unit 21, a storing unit 22, a degradation condition calculating unit 23, and the power supply unit 24. Furthermore, the second interface board 2 can be inserted into and extracted from the transmission apparatus.

The storing unit 22 is a storage device, such as a hard disk or a memory. Furthermore, similarly to the storing unit 12 in the first interface board 1, the storing unit 22 stores therein the information illustrated in FIG. 3.

If the power supply unit 24 is ON, the second signal processing unit 21 performs a process, such as inter-conversion between an optical signal and an electrical signal and error detection, on the signal received from the receiving unit 3.

The degradation condition calculating unit 23 includes a storage medium, such as a memory or a hard disk. Similarly to the degradation condition calculating unit 13 in the first interface board 1, the degradation condition calculating unit 23 stores therein failure prediction coefficient tables used to obtain a failure prediction date from the failure prediction date equation. Furthermore, the degradation condition calculating unit 23 previously stores therein failure prediction date equations represented by Equations (1) and (2). The degradation condition calculating unit 23 obtains, from each unit, failure prediction date equation information needed to predict the failure prediction date. Then, the degradation condition calculating unit 23 calculates the failure prediction date of the second interface board 2 using Equations (1) and (2). Furthermore, the degradation condition calculating unit 23 allows the storing unit 22 to store therein the calculated failure prediction date of the second interface board 2.

In response to the instruction received from the electrical power supply control unit 5, the power supply unit 24 performs the ON/OFF operation of its power supply. If the power supply is ON, the power supply unit 24 supplies electrical power, which is supplied from the electrical power supplying unit 4, to each unit in the second interface board 2. If the power supply is OFF, the power supply unit 24 does not received electrical power from the electrical power supplying unit 4.

Figure 6:
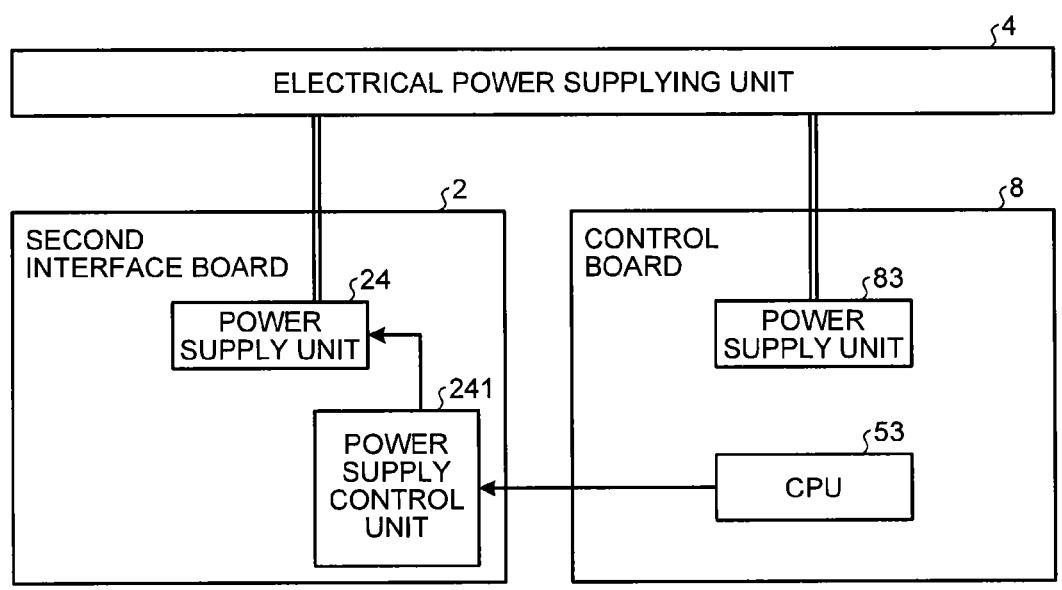
FIG. 6 is a schematic diagram illustrating the ON/OFF mechanism of a power supply of an interface board.

FIG. 6 is a schematic diagram illustrating the ON/OFF mechanism of a power supply of an interface board. In the following, the ON/OFF mechanism of a power supply of the second interface board 2 will be described with reference to FIG. 6. As illustrated in FIG. 6, a power supply control unit 241 that is used to perform the ON/OFF operation of a power supply of the power supply unit 24 is arranged in the second interface board 2. The control board 8 includes a power supply unit 83 and a CPU 53. The CPU 53 may also be a part of the electrical power supply control unit 5. Furthermore, electrical power is individually supplied to the second interface board 2 and the control board 8 from the electrical power supplying unit 4. The control board 8 receives electrical power supplied from the power supply unit 83. The power supply unit 83 supplies electrical power to each unit, such as the CPU 53, arranged on the control board 8. The CPU 53 outputs, to the power supply control unit 241 in the second interface board 2, a control instruction for performing the ON/OFF operation of the power supply of the power supply unit 24. In response to the control received from the CPU 53, the power supply control unit 241 performs the ON/OFF operation of the power supply of the power supply unit 24.

As described above, the CPU 53 arranged on the control board 8 controls the ON/OFF operation of the power supply of the power supply unit 24 in the second interface board 2. Furthermore, the electrical power is independently supplied to the control board 8 and the second interface board 2. Accordingly, even if the second interface board 2 is in a state in which it is inserted in the transmission apparatus, it is possible to stop supplying electrical power to the second interface board 2. In the second embodiment, a description has been given by using the second interface board 2 as an example; however, the ON/OFF operation of the power supply may also be performed, using the same operation, in another interface board that includes a power supply unit having the same configuration as the power supply unit 24.

In the second embodiment, if the second interface board 2 is used as an active interface, in order to control the power supply of the first interface board 1 by using a failure prediction date, the degradation condition calculating unit 23 is arranged in the second interface board 2. A case in which the second interface board 2 is used as an active interface is a case in which, for example, if the first interface board 1 fails and then is recovered, the second interface board 2 is used as an active interface and the first interface board 1 is used as a standby interface. However, if the second interface board 2 is not used as an active interface, i.e., the first interface board 1 is again used as an active interface after the failure of the first interface board 1 is recovered, then the degradation condition of the second interface board 2 does not need to be obtained. In such a case, the degradation condition calculating unit 23 does not need to be arranged in the second interface board 2.

In the second embodiment, the electrical power supply control unit 5, the switching control unit 6, the storing unit 81, and a notifying unit 82 are arranged on the control board 8 indicated by the dashed line illustrated in FIG. 2. Specifically, an MPU board and an SW board are examples of the control board 8. Furthermore, an SW board is an example of the switching control unit 6.

The electrical power supply control unit 5 has a calendar. The electrical power supply control unit 5 obtains a failure prediction date of an active interface board. In the second embodiment, because the first interface board 1 is an active interface, the electrical power supply control unit 5 receives an input of the failure prediction date calculated by the degradation condition calculating unit 13 from the degradation condition calculating unit 13. Then, the electrical power supply control unit 5 determines whether the current date exceeds the failure prediction date of the first interface board 1.

If the current date does not exceed the failure prediction date of the first interface board 1, the electrical power supply control unit 5 turns OFF the power supply of the power supply unit 24. Accordingly, the supply of electrical power from the electrical power supplying unit 4 to the power supply unit 24 in the second interface board 2 is prohibited. In the following, turning OFF the power supply and prohibiting the supply of electrical power to an interface board may sometimes be referred to as an "electrical power saving setting". In the second embodiment, when the second interface board 2 is inserted into the transmission apparatus, the electrical power supply control unit 5 supplies, at least once, electrical power to the second interface board 2. Then, the electrical power supply control unit 5 turns OFF the power supply of the power supply unit 24 so as not to supply electrical power to the second interface board 2 and then operates in the electrical power saving setting on the second interface board 2. By supplying electrical power to the second interface board 2 when the second interface board 2 is inserted into the transmission apparatus, physical inventories, such as the production name of a transmission module, bit rates, the product drawing number, and the serial number, are read and stored in the control board 8.

If the current date exceeds the failure prediction date, the electrical power supply control unit 5 instructs the notifying unit 82 to notify a failure prediction alarm. Then, the electrical power supply control unit 5 turns ON the power supply of the power supply unit 24. Accordingly, electrical power is supplied from the electrical power supplying unit 4 to the power supply unit 24 in the second interface board 2.

Furthermore, in the second embodiment, the electrical power supply control unit 5 can receive an input of an instruction of a cancel date of the electrical power saving setting from an administrator. If the cancel date of the electrical power saving setting is input, an electrical power supply control unit 15 turns OFF the power supply of the power supply unit 24, operates in the electrical power saving setting, and then determines whether the current date exceeds the cancel date. If the current date exceeds the cancel date, the electrical power supply control unit 5 turns ON the power supply of the power supply unit 24. If the current date does not exceed the cancel date, the electrical power supply control unit 5 keeps the power supply of the power supply unit 24 OFF. In the second embodiment, if a cancel date is specified, the electrical power supply control unit 5 operates by giving the cancel date priority over the failure prediction date. In the second embodiment, for a scheduled operation performed by an administrator, a cancel operation of the electrical power saving setting is performed due to the input of a cancel date; however, the transmission apparatus according to the second embodiment can operate without this cancel date setting.

In response to the instruction to notify the failure prediction alarm received from the electrical power supply control unit 5, the notifying unit 82 notifies an administrator of the transmission apparatus of the failure prediction alarm. In the second embodiment, to improve safety, an administrator receives a notification indicating that the probability of a failure occurring in the first interface board 1 is becoming high; however, the transmission apparatus according to the second embodiment can operate without sending such a notification.

The storing unit 81 includes a storage device, such as a hard disk or a memory. Furthermore, the storing unit 81 has a calendar. The storing unit 81 stores therein an installation date that is the date on which the first interface board 1 is inserted in the transmission apparatus. In the second embodiment, a case has been described in which the storing unit 81 has a calendar; however, another method may also be used. For example, the storing unit 81 may also use the calendar in the electrical power supply control unit 5.

In the second embodiment, because the first interface board 1 is an active interface, the switching control unit 6 selects the first interface board 1 as an interface that is allowed to perform data processing until it is determined that a failure has occurred in the first interface board 1. Then, the switching control unit 6 switches circuits such that data processed by the first interface board 1 is transmitted to the transmitting unit 7.

Furthermore, the switching control unit 6 obtains state information on the first interface board 1. The state information mentioned here includes, for example, the temperature or error information. If the first interface board 1 does satisfy a predetermined condition, the switching control unit 6 determines that a problem has occurred in the first interface board 1. For example, if an error indicating that data is not transmitted occurs in the first interface board 1, the switching control unit 6 determines that a problem has occurred in the first interface board 1. Then, the switching control unit 6 selects the second interface board 2 as an interface that is allowed to perform the data processing. Then, the switching control unit 6 switches circuits such that the data processed by the second interface board 2 is transmitted to the transmitting unit 7. FIG. 2 illustrates the performance of the physical switching of circuits; however, another method may also be used. For example, the switching control unit 6 first receives both signals, discards a signal other than a signal to be used, and inputs the remaining signal to the transmitting unit 7.

Figure 7:
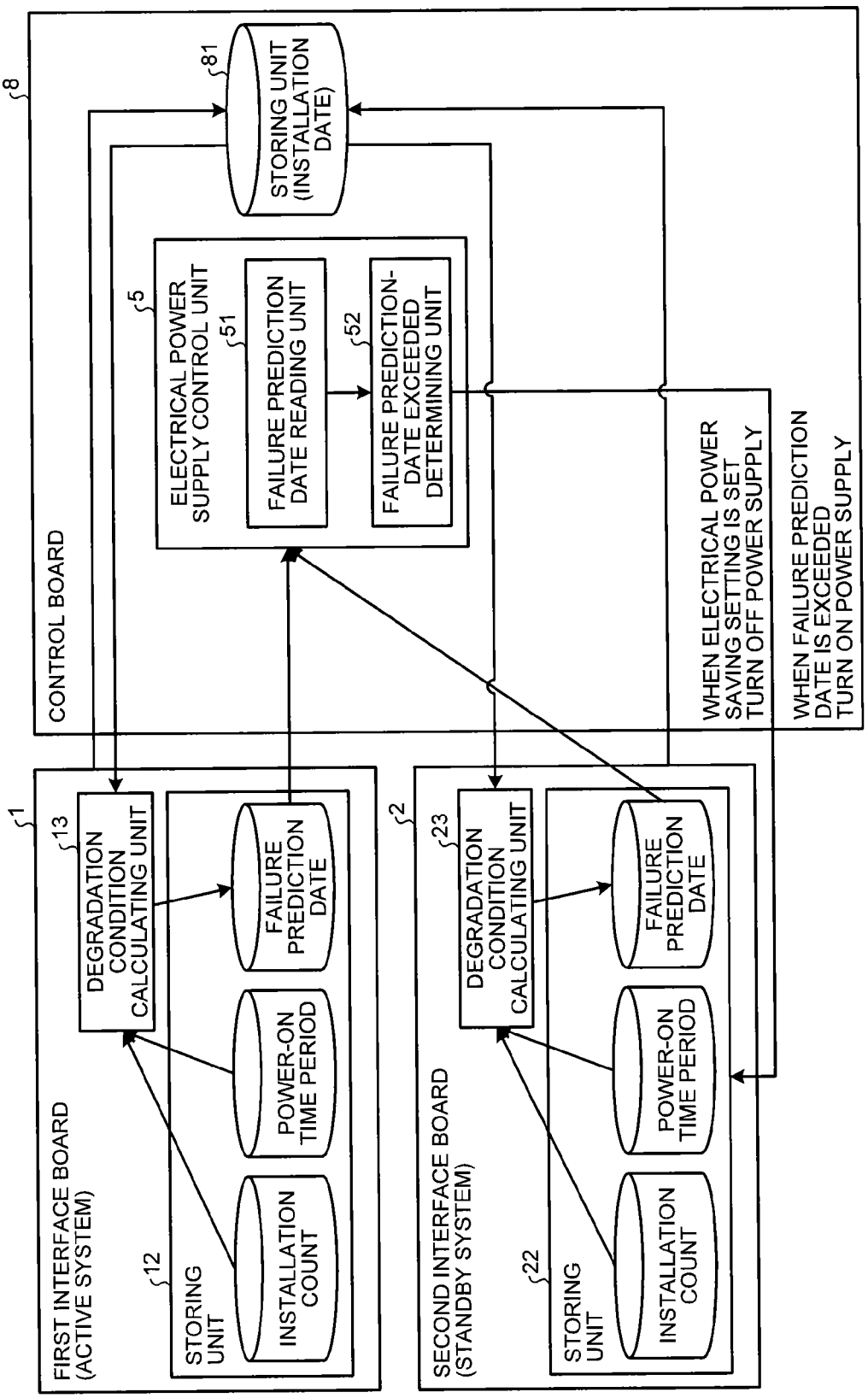
FIG. 7 is a schematic diagram illustrating a process performed by an interface board and a control board.

In the following, the overall process for controlling the ON/OFF operation of a power supply of an interface board will be described with reference to FIG. 7. FIG. 7 is a schematic diagram illustrating a process performed by an interface board and a control board.

When the first interface board 1 is inserted in the transmission apparatus, an installation date that is the date of the insertion is stored in the storing unit 81 on the control board 8. Furthermore, if the second interface board 2 is inserted into the transmission apparatus, an installation date that is the date of the insertion is stored in the storing unit 81 on the control board 8.

Furthermore, the storing unit 12 in the first interface board 1 stores therein an installation count and a power-on time period of the first interface board 1. Then, the degradation condition calculating unit 13 reads the installation count and the power-on time period stored in the storing unit 12 and the installation date of the first interface board 1 stored in the storing unit 81 on the control board 8 and then calculates the failure prediction date of the first interface board 1 by using the failure prediction date equation. Then, the degradation condition calculating unit 13 allows the storing unit 12 to store the failure prediction date.

Furthermore, the storing unit 22 in the second interface board 2 stores therein the installation count and the power-on time period of the second interface board 2. The degradation condition calculating unit 23 reads the installation count and the power-on time period stored in the storing unit 22 and the installation date of the second interface board 2 stored in the storing unit 81 on the control board 8 and then calculates the failure prediction date of the second interface board 2 by using the failure prediction date equation. Then, the degradation condition calculating unit 23 allows the storing unit 22 to store the failure prediction date.

The electrical power supply control unit 5 arranged on the control board 8 includes a failure prediction date reading unit 51 and a failure prediction-date exceeded determining unit 52.

The failure prediction date reading unit 51 reads a failure prediction date from the storing unit 12 in the first interface board 1 and outputs it to the failure prediction-date exceeded determining unit 52. Furthermore, the failure prediction date reading unit 51 reads a failure prediction date from the storing unit 22 in the second interface board 2 and outputs it to the failure prediction-date exceeded determining unit 52.

The failure prediction-date exceeded determining unit 52 compares the current date with the failure prediction date of the first interface board 1, which is an active interface board, and determines whether the current date exceeds the failure prediction date. Then, the failure prediction-date exceeded determining unit 52 outputs the determination result to the electrical power supply control unit 5. In the second embodiment, a description has been given of a case in which an active interface board is the first interface board 1; however, if the second interface board 2 is an active interface board, the failure prediction-date exceeded determining unit 52 performs the determination by using the failure prediction date of the second interface board 2.

The electrical power supply control unit 5 receives an input of the determination result from the failure prediction-date exceeded determining unit 52. If the current date does not exceed the failure prediction date, the electrical power supply control unit 5 determines the electrical power saving setting is to be set, turns OFF the power supply of the second interface board 2, and operates under the electrical power saving setting. Furthermore, if the current date exceed the failure prediction date, the electrical power supply control unit 5 turns ON the power supply of the second interface board 2 and cancels the electrical power saving setting.

Figure 8:
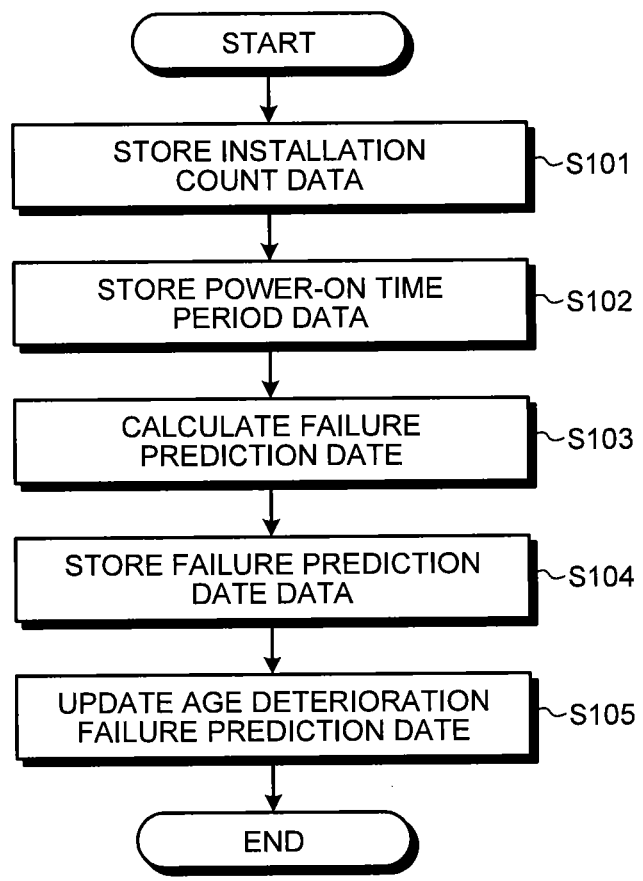
FIG. 8 is a flowchart illustrating the flow of a process performed by the interface board.

In the following, the flow of a process performed by the first interface board 1 under the electrical power saving setting will be described with reference to FIG. 8. FIG. 8 is a flowchart illustrating the flow of a process performed by the interface board. In the following, a description will be given of a case, as an example, in which the first interface board 1 is used as an interface board.

The first interface board 1 increments the installation-count counter when the first interface board 1 is inserted into the transmission apparatus and stores data on its installation count in the storing unit 12 (Step S101).

Furthermore, if a predetermined time has elapsed, the first interface board 1 increments the power-on time period counter and stores data on its power-on time period in the storing unit 12 (Step S102).

The degradation condition calculating unit 13 obtains the power-on time period and the installation count stored in the storing unit 12, obtains the installation date and time stored in the storing unit 81 on the control board 8, and calculates the failure prediction date of the first interface board 1 by using the failure prediction date equation (Step S103).

Then, the degradation condition calculating unit 13 stores the calculated failure prediction date data in the storing unit 12 (Step S104).

Furthermore, the degradation condition calculating unit 13 calculates a failure prediction date every time a predetermined time period has elapsed and updates the failure prediction date stored in the storing unit 12 (Step S105).

Figure 9:
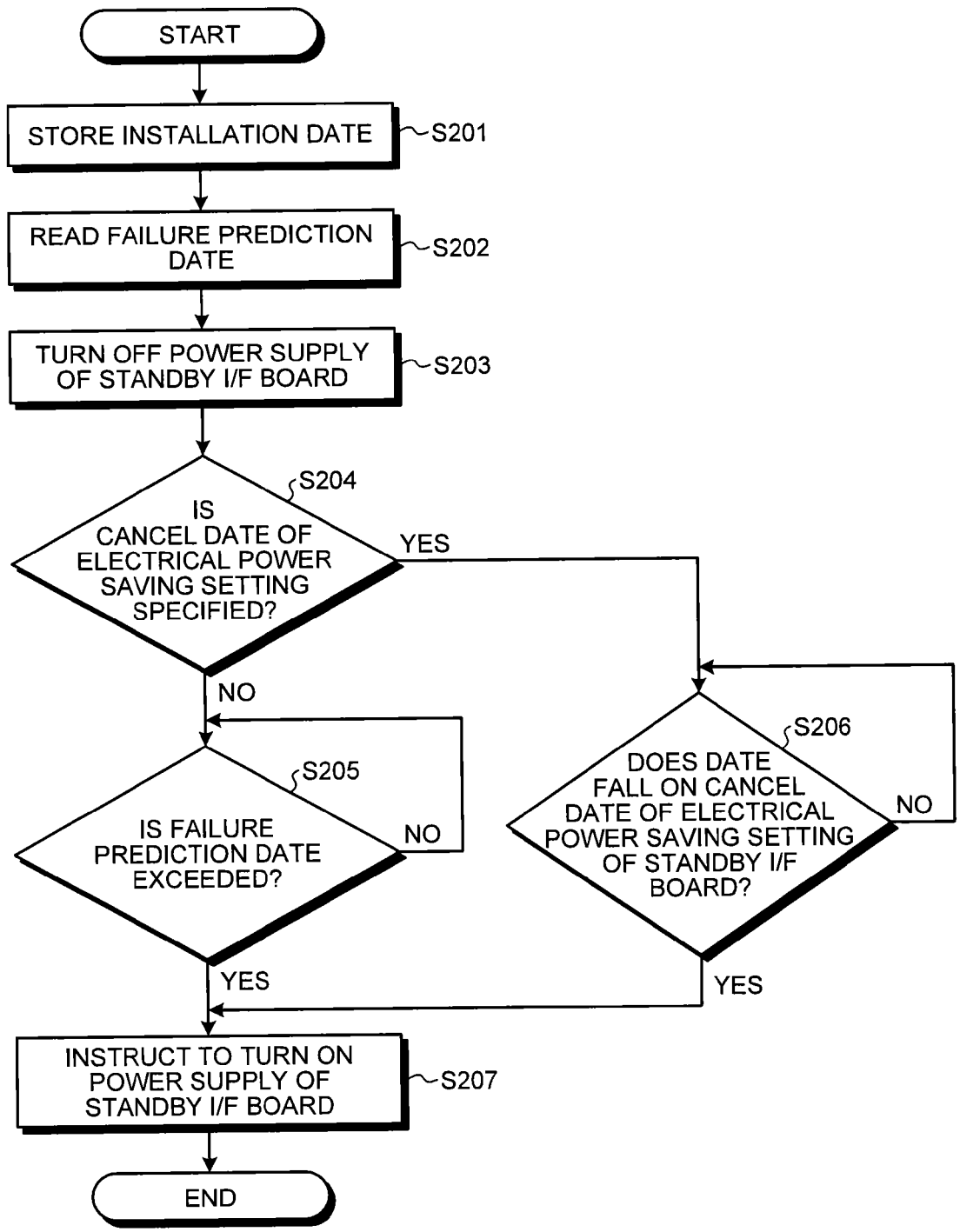
FIG. 9 is a flowchart illustrating the flow of a process performed by the control board.

In the following, the flow of a process performed by the control board 8 under an electrical power saving setting will be described with reference to FIG. 9. FIG. 9 is a flowchart illustrating the flow of a process performed by the control board.

If the first interface board 1 or the second interface board 2 is inserted into the transmission apparatus, the control board 8 stores, in the storing unit 81, the installation date that is the date of the installation of the interface board (Step S201).

The electrical power supply control unit 5 reads each of the failure prediction dates from the storing unit 12 on the first interface board 1 and the storing unit 22 on the second interface board (Step S202).

Then, the electrical power supply control unit 5 turns OFF the power supply of the second interface board 2 that is a standby interface board (Step S203). Accordingly, the electrical power saving setting is set.

The electrical power supply control unit 5 determines whether an administrator specifies a cancel date of the electrical power saving setting (Step S204). If the cancel date is not specified (No at Step S204), the electrical power supply control unit 5 determines whether the current date exceeds the failure prediction date (Step S205). If the current date does not exceed the failure prediction date (No at Step S205), the electrical power supply control unit 5 waits without processing anything. In contrast, if the current date exceeds the failure prediction date (Yes at Step S205), the electrical power supply control unit 5 instructs the second interface board 2 corresponding to the standby interface board to turn ON the power supply of the power supply unit 24 (Step S207).

In contrast, a cancel date is specified (Yes at Step S204), the electrical power supply control unit 5 determines whether the current date falls on the cancel date (Step S206). If the current date does not fall on the cancel date (No at Step S206), the electrical power supply control unit 5 waits without processing anything. In contrast, if the current date falls on the cancel date (Yes at Step S206), the electrical power supply control unit 5 instructs the second interface board 2 corresponding to the standby interface board to turn ON the power supply of the power supply unit 24 (Step S207).

In the above, a description has been given of the electrical power saving setting in operation in a redundant configuration in which the first interface board 1 and the second interface board 2 are used; however, in the second embodiment, the similar electrical power saving setting is also set in another unit having a redundant configuration. The other unit mentioned here is, for example, an MPU board or an SW board. In the second embodiment, an MPU board is paired with an SW board and has a redundant configuration. Similarly to the first interface board 1, a storing unit and a power supply unit, which can control the ON/OFF operation of the power supply performed by the degradation condition calculating unit and the electrical power supply control unit 5, are arranged in each of the MPU board and the SW board. Furthermore, similarly to the first interface board 1, the storing unit included in each of the MPU board and the SW board is allowed to store the power-on time period, a failure prediction date is calculated by the degradation condition calculating unit, and, by using the failure prediction date, the electrical power supply control unit 5 controls the ON/OFF operation of the power supply of the power supply unit on the MPU board and the SW board. Accordingly, the electrical power saving setting can be in operation in the MPU board and the SW board having a redundant configuration. As described above, the failure resistance is higher if an MPU board and an SW board having a redundant configuration is used. Furthermore, by operating under the electrical power saving setting, the electrical power consumption can be reduced. In the second embodiment, to improve the failure resistance, a redundant configuration is used for the MPU board and the SW board and the electrical power saving setting is set in each of the boards; however, the transmission apparatus according to the second embodiment can operate even when a redundant configuration is used for only the interface board. Even in this case, it is possible to save electrical power of the interface board, thus reducing the overall electrical power consumption.

Figure 10A:
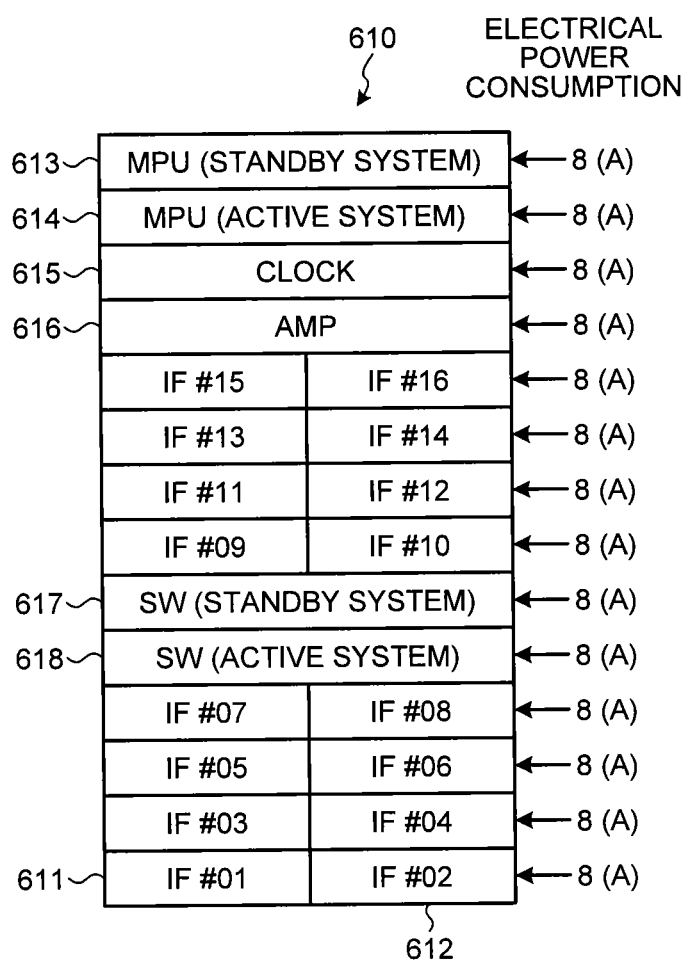
FIG. 10A is a schematic diagram illustrating electrical power consumption obtained when an electrical power saving setting is not in operation.
Figure 10B:
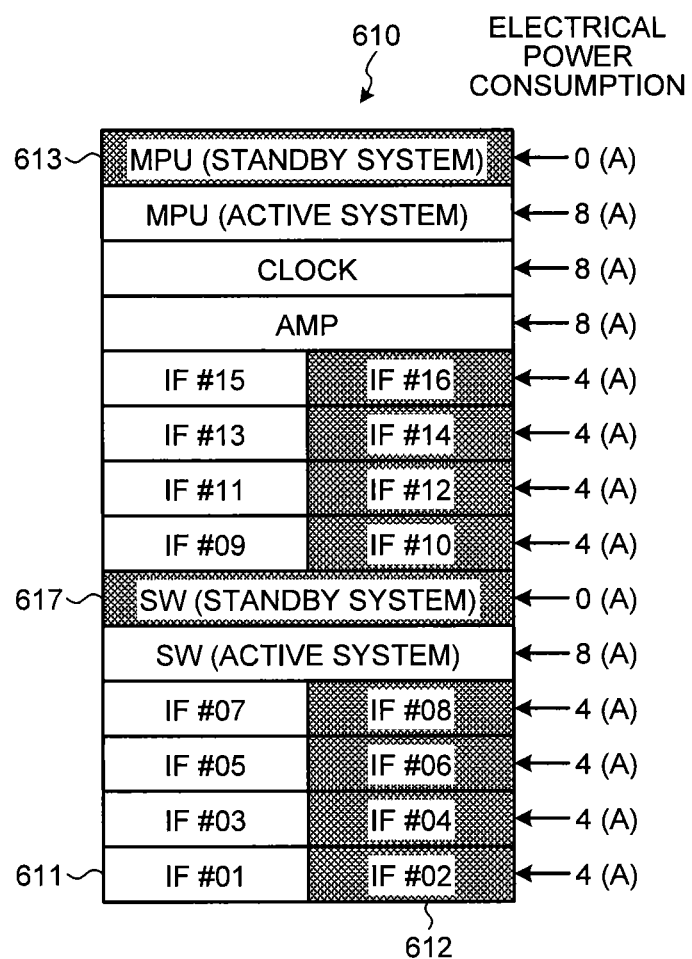
FIG. 10B is a schematic diagram illustrating electrical power consumption obtained when an electrical power saving setting is in operation.

In the following, the effect of reducing electrical power consumption by setting the electrical power saving setting will be described with reference to FIGS. 10A and 10B. FIG. 10A is a schematic diagram illustrating electrical power consumption obtained when an electrical power saving setting is not in operation. FIG. 10B is a schematic diagram illustrating electrical power consumption obtained when an electrical power saving setting is in operation. In this example, it is assumed that interface boards, MPU boards, and SW boards have a redundant configuration and it is assumed that the electrical power saving setting is set in all of the boards.

In FIG. 10A, a transmission apparatus 610 includes units, such as an MPU 613 that is a standby system, an MPU 614 that is an active system, a CLOCK 615 that is a clock output apparatus, an AMP 616 that is an amplifier, an SW 617 that is a standby switch, and an SW 618 that is an active switch. Furthermore, the transmission apparatus 610 includes IFs #01 to #16 as interface boards. In this example, an interface board 611 is the IF #01 and an interface board 612 is the IF #02. The interface boards arranged side by side in the plane of the drawing are a single set and have a redundant configuration. Furthermore, the interface boards arranged on the left side in the plane of the drawing are active interface boards, and the interface board arranged on the right side in the plane of the drawing are standby interface boards. For example, the interface board 611 (IF #01) and the interface board 612 (IF #02) have a redundant configuration; the interface board 611 is an active interface board and the interface board 612 is a standby interface board.

As illustrated in FIG. 10A, in the transmission apparatus 610, if the electrical power saving setting is not in operation, electrical power is supplied to all of the units. In the second embodiment, it is assumed that 8 A is consumed per unit in a long size unit, such as the MPU 613 or the CLOCK 615. Furthermore, it is assumed that 4 A is consumed per unit in a half size unit, such as the IF #01 corresponding to the interface board 611 or the IF #02 corresponding to the interface board 612. In such a case, because electrical power is supplied to all of the units, the sum total of electrical power used is 112 A.

If the electrical power saving setting is set in the transmission apparatus 610, the state thereof becomes the state illustrated in FIG. 10B. The grayed-out units illustrated in FIG. 10B are units in which the power supply is turned OFF and the supply of electrical power is prohibited. Specifically, the power supply for the MPU 613, the SW 617, and the interface boards arranged on the right side in the plane of the drawing is turned OFF. For example, in the interface board 611 (IF #01) and the interface board 612 (IF #02) having a redundant configuration, electrical power is supplied to the active interface board 611 but is not supplied to the standby interface board 612. Accordingly, the electrical power of the interface board 612 can be reduced. In this case, the sum total of electrical power used is 64 A. Accordingly, the electrical power consumption can be reduced by 43% when compared with a case in which electrical power is supplied to all of the units.

Figure 11A:
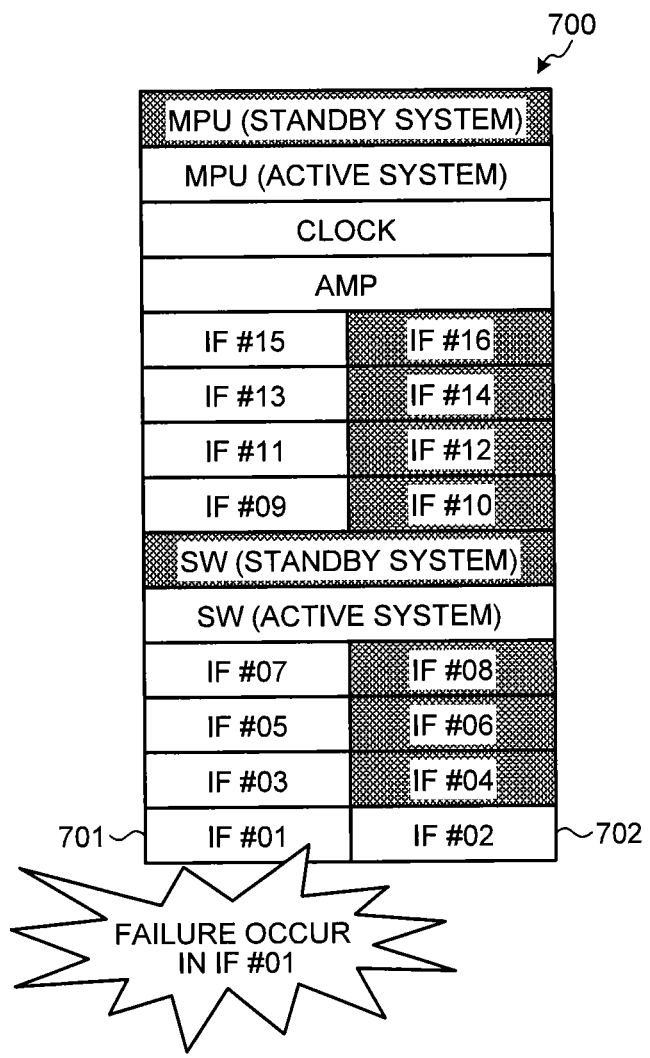
FIG. 11A is a schematic diagram illustrating the state when a failure occurs when an electrical power saving setting is cancelled.
Figure 11B:
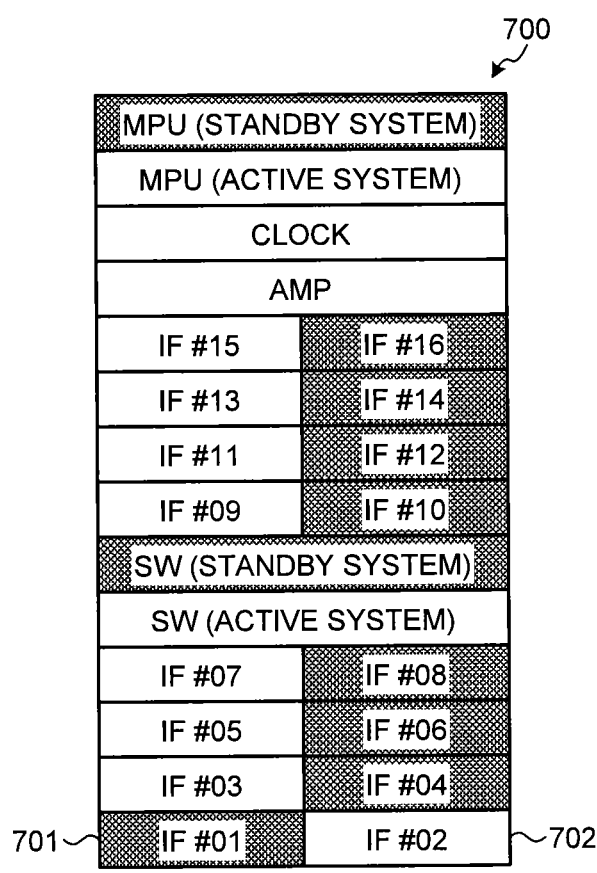
FIG. 11B is a schematic diagram illustrating the state after a failure has occurred.
Figure 11C:
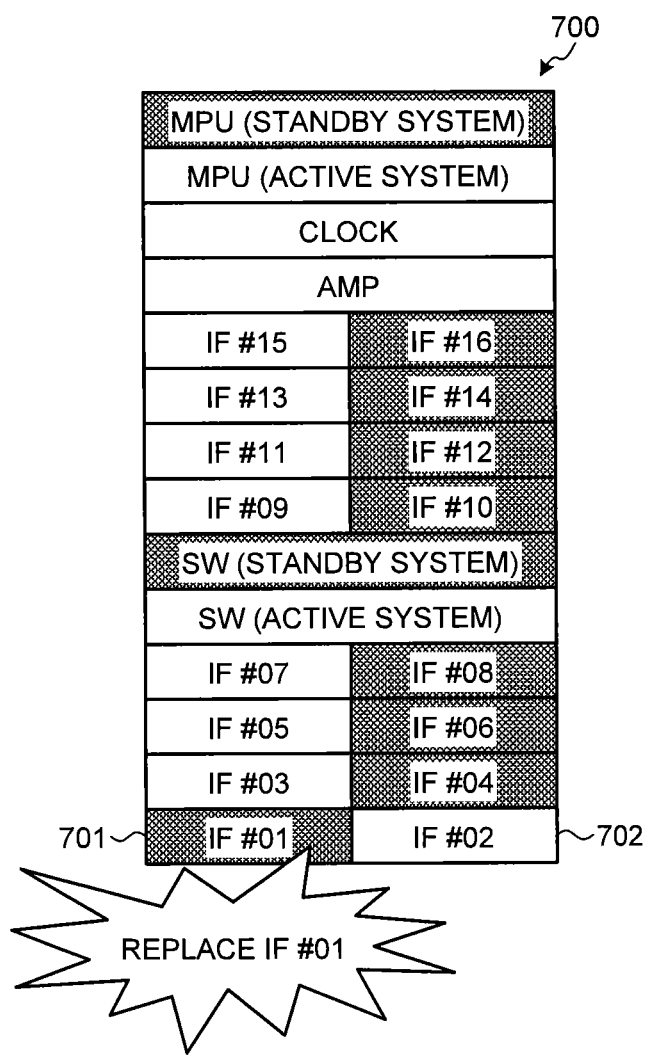
FIG. 11C is a schematic diagram illustrating the state after coping with a failure.

In the following, an operation performed when a failure occurs after an electrical power saving setting is cancelled will be described with reference to FIGS. 11A to 11C. FIG. 11A is a schematic diagram illustrating the state at the time of failure when an electrical power saving setting is cancelled. FIG. 11B is a schematic diagram illustrating the state after a failure has occurred. FIG. 11C is a schematic diagram illustrating the state after coping with a failure.

In FIG. 11A, it is assumed that the electrical power saving setting that is set in an interface board 702 in a transmission apparatus 700 is cancelled. As illustrated in FIG. 11A, if an electrical power saving setting in the interface board 702 is cancelled because, for example, a failure prediction date is exceeded, electrical power is supplied to both an interface board 701 and the interface board 702. At this point, it is assumed that a failure occurs in the IF #01 corresponding to the interface board 701.

Then, as illustrated in FIG. 11B, because a failure has occurred, electrical power is not supplied to the interface board 701 but is supplied to the interface board 702. Then, the switching control unit 6 performs the switching such that the signal processed by the interface board 702 is transmitted to the transmitting unit 7.

Thereafter, as illustrated in FIG. 11C, a failure that has occurred in the interface board 701 is recovered due to, for example, the IF #01 being repaired. Then, an administrator determines which of the interface board 701 and the interface board 702 is to be used. In the second embodiment, it is assumed that the interface board 701, which is used as an active system, and the interface board 702, which is used as a standby system, are recovered to their states before the failure. At this point, an electrical power saving setting is set in the interface board 702 and the supply of electrical power of the interface board 702 is prohibited. In this state, even when the interface board 701 is extracted due to a replacement, data on the installation count and power-on time period is still retained. Accordingly, when the interface board 701 is again inserted, the data on the installation count and the power-on time period related to the interface board 701 is continuously accumulated together with the data stored before the failure. Accordingly, the failure prediction date of the interface board 701 is also continuously retained. In the second embodiment, an interface board retains an installation count and a power-on time period; however, it may also allow the storing unit 81 on the control board 8 to store an installation count and a power-on time period when an interface board is extracted and data may be read from the storing unit 81 when an interface board is inserted again.

As described above, the transmission apparatus according to the second embodiment calculates a failure prediction date of a redundant interface board or of the other units and prohibits, if the current date is before the failure prediction date, the supply of electrical power to the standby system. Accordingly, electrical power consumed in the standby system can be reduced, thus the electrical power consumption can be reduced. Furthermore, because electrical power is supplied to the standby system after the failure prediction date, it is possible to continue a process without stopping the process even if a failure occurs. Furthermore, because the failure prediction date is calculated on the basis of the statistical incidence of failure, the incidence of failure becomes high after the failure prediction date. Specifically, in the transmission apparatus according to the second embodiment, if the incidence of failure becomes high, electrical power is supplied to a standby system and switching can be made any time. Accordingly, it is possible to reduce electrical power consumed in the transmission apparatus and reduce the occurrence of an instantaneous power interruption when a failure does occur.

In the second embodiment, when a failure prediction date is calculated, a power-on time period and an installation count, which are assumed to statistically and significantly affect the occurrence of a failure, are used as parameters. However, it may also be possible to use, as a parameter for calculating a failure prediction date, another parameter that may be assumed to be statistically related to the occurrence of a failure. For example, error bits of a line or a total amount of data processing performed by an interface board may also be used as a parameter for calculating a failure prediction date.

[c] Third Embodiment

Figure 12:
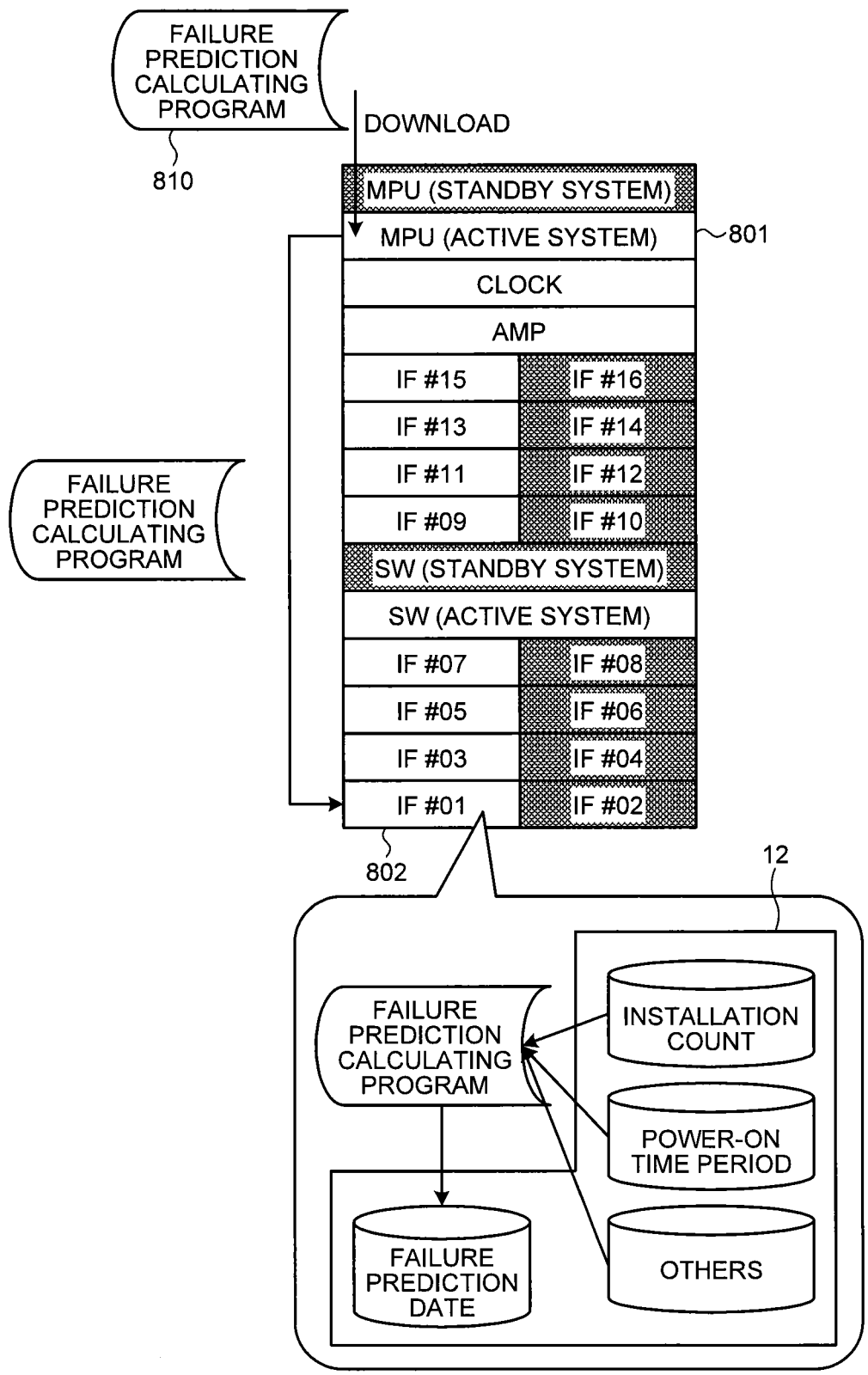
FIG. 12 is a schematic diagram illustrating a process for updating a failure prediction calculating program and a process performed after the update thereof.

In the following, a transmission apparatus according to a third embodiment will be described. The transmission apparatus according to the third embodiment differs from the second embodiment in that a failure prediction calculating program including a failure prediction date equation is updated. A block diagram of the transmission apparatus according to the second embodiment can also be represented by FIG. 2. FIG. 12 is a schematic diagram illustrating a process for updating a failure prediction calculating program and a process performed after the update thereof.

As illustrated in FIG. 12, an active MPU 801 downloads a latest failure prediction program 810 from an external device, such as a server. The failure prediction program 810 contains a failure prediction date equation or the like. Furthermore, the failure prediction program 810 may also contain a new parameter for calculating a failure prediction date. An interface board 802 obtains the latest failure prediction program 810 from the MPU 801. Then, the interface board 802 updates the failure prediction program 810 by, for example, reinstalling it. Then, the degradation condition calculating unit 13 on the interface board 802 calculates a new failure prediction date by using, for the failure prediction program 810, the installation count and the power-on time period stored in the storing unit 12 and a new specified parameter. Then, the degradation condition calculating unit 13 allows the storing unit 12 to store the new calculated failure prediction date.

The electrical power supply control unit 5 performs, by using the new calculated failure prediction date, the setting and the cancellation of the electrical power saving setting.

As described above, the transmission apparatus according to the third embodiment can update a failure prediction program including the failure prediction date equation. In the failure prediction program, a new parameter can be used to calculate a failure prediction date and a new parameter can be added to calculate a failure prediction date. Accordingly, it is possible to calculate a failure prediction date suitable for each unit or operation condition, and it is possible to accurately obtain a failure prediction date on which the incidence of failure is high, which makes it possible to reduce the possibility of the risk of interruption of signal transmission due to a failure.

According to an aspect of the transmission apparatus and the transmission apparatus control method disclosed in the present invention, an advantage is provided in that it is possible to reduce electrical power consumed by the transmission apparatus and to reduce the occurrence of an instantaneous power interruption when a failure occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a receiving unit that receives a signal from an external source;
   an electrical power supplying unit that supplies electrical power;
   a first interface board that includes a first signal processing unit that performs a predetermined process on the signal received by the receiving unit;
   a second interface board that includes a second signal processing unit that performs the predetermined process on the signal received by the receiving unit;
   a switching control unit that selects the first interface board when no failure occurs in both the first interface board and the second interface board and that performs switching to select the second interface board when a failure occurs in the first interface board;
   an electrical power supply control unit that, in a case in which no failure occurs in both the first interface board and the second interface board and when the first interface board does not satisfy a predetermined degradation condition, supplies electrical power from the electrical power supplying unit to the first interface board and prohibits supply to the second interface board and that, in a case in which no failure occurs in both the first interface board and the second interface board and when the first interface board does satisfy the predetermined degradation condition, supplies electrical power from the electrical power supplying unit to both the first interface board and the second interface board; and
   a transmitting unit that transmits a signal processed by one of the first interface board and the second interface board that is selected by the switching control unit.

2. The transmission apparatus according to claim 1, wherein multiple pairs of the first interface board and the second interface board are included.

3. The transmission apparatus according to claim 1, further comprising a failure prediction date calculating unit that calculates a failure prediction date as the degradation condition on the basis of age deterioration information on the first interface board.

4. The transmission apparatus according to claim 3, wherein the age deterioration information includes a power-on time period of the first interface board.

5. The transmission apparatus according to claim 3, wherein
   the first interface board and the second interface board are allowed to be inserted into and extracted from the transmission apparatus, and
   the age deterioration information contains the number of times the first interface board is inserted into the transmission apparatus.

6. The transmission apparatus according to claim 1, further comprising a first control board and a second control board each of which includes a control unit that controls the first interface board and the second interface board, respectively, wherein
   the switching control unit selects the first control board when no failure occurs in both the first control board and the second control board and performs switching to selects the second control board when a failure occurs in the first control board, and
   in a case in which no failure occurs in the first control board and the second control board, the electrical power supply control unit supplies electrical power from the electrical power supplying unit to the first control board and prohibits supply to the second control board when the first control board does not satisfy a predetermined degradation condition and supplies electrical power from the electrical power supplying unit to both the first control board and the second control board when the first control board satisfies the predetermined degradation condition.

7. A transmission apparatus control method comprising:
   receiving a signal from an external source;
   determining whether, when no failure occurs in both a first interface board and a second interface board, the first interface board satisfies a predetermined degradation condition;
   supplying electrical power to the first interface board and prohibiting supply of electrical power to the second interface board when the first interface board does not satisfy the predetermined degradation condition;
   supplying electrical power to both the first interface board and the second interface board when the first interface board satisfies the predetermined degradation condition;
   selecting the first interface board when no failure occurs in both the first interface board and the second interface board;
   processing, in the first interface board, the signal received at the receiving;
   transmitting the signal processed at the processing in the first interface board;
   switching, when a failure occurs in the first interface board, such that the second interface board is selected;
   processing, in the second interface board, the signal received at the receiving; and
   transmitting the signal processed at the processing in the second interface board.

* * * * *

UNITED STATES PATENT AND TRADEMARK OFFICE
CERTIFICATE OF CORRECTION

PATENT NO.        : 9,032,257 B2                                  Page 1 of 1
APPLICATION NO.   : 13/676470
DATED             : May 12, 2015
INVENTOR(S)       : Nobuo Sashida et al.

It is certified that error appears in the above-identified patent and that said Letters Patent is hereby corrected as shown below:

Title Page, First Column, (72) Inventors, Line 1
Delete " Sagmihara" and insert --Sagamihara--, therefor.

Title Page, First Column, (63) Related U.S. Application Data
Insert --Continuation of application No. PCT/JP2010/059141, filed on May 28, 2010.--.

Signed and Sealed this
Thirteenth Day of October, 2015

Michelle K. Lee
*Director of the United States Patent and Trademark Office*